United States Patent
Hummel et al.

(10) Patent No.: US 11,639,782 B2
(45) Date of Patent: May 2, 2023

(54) HEADLAMP AND HEADLAMP SYSTEM FOR A MOTOR VEHICLE

(71) Applicant: Dr. Ing. h.c. F. Porsche Aktiengesellschaft, Stuttgart (DE)

(72) Inventors: Benjamin Hummel, Tamm (DE); Dominik Walter, Rutesheim (DE); Johannes Grabowski, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 17/837,770

(22) Filed: Jun. 10, 2022

(65) Prior Publication Data
US 2022/0397256 A1 Dec. 15, 2022

(30) Foreign Application Priority Data
Jun. 11, 2021 (DE) ...................... 10 2021 115 179.1

(51) Int. Cl.
*F21S 41/663* (2018.01)
*F21S 41/25* (2018.01)

(52) U.S. Cl.
CPC ............. *F21S 41/663* (2018.01); *F21S 41/25* (2018.01)

(58) Field of Classification Search
None
See application file for complete search history.

(56) References Cited

U.S. PATENT DOCUMENTS

| | | | |
|---|---|---|---|
| 11,235,700 B2 | 2/2022 | Brill et al. | |
| 2018/0339643 A1* | 11/2018 | Kim | F21S 41/663 |
| 2018/0345848 A1* | 12/2018 | Orisich | B60Q 1/1423 |

FOREIGN PATENT DOCUMENTS

| | | |
|---|---|---|
| DE | 102016210645 | 12/2017 |
| DE | 102017114903 | 1/2019 |

* cited by examiner

*Primary Examiner* — Elmito Breval
(74) *Attorney, Agent, or Firm* — Gerald E. Hespos; Michael J. Porco

(57) ABSTRACT

A headlamp (10) for a motor vehicle has a first projection device (12) for illuminating a wide surface (18) and a second projection device (14) laterally offset from the first projection device (12) for illuminating a narrow surface (20) lying within the wide surface (18). Intensity profiles (22, 24) of light emitted by the first and second projection devices (12, 14) are matched in the lateral direction such that, in at least one lateral peripheral region of the narrow surface (20), a gradual transition to the intensity in the wide surface (18) outside the narrow surface (2) and a substantially constant intensity between the lateral peripheral regions of the narrow surface (20) within the narrow surface (20) occur. Intensity profiles (22, 24) of the projection devices (12, 14) are designed for a shorter distance than a projection distance designated for the wide surface (18) and the narrow surface (20).

10 Claims, 1 Drawing Sheet

HEADLAMP AND HEADLAMP SYSTEM FOR A MOTOR VEHICLE

CROSS REFERENCE TO RELATED APPLICATION

This application claims priority on German Patent Application No 10 2021 115 179.1 filed Jun. 11, 2021, the entire disclosure of which is incorporated herein by reference.

BACKGROUND

Field of the Invention. The invention relates to a headlamp and to a headlamp system for a motor vehicle to provide an illumination region in front of the motor vehicle.

Related Art. DE 10 2017 114 903 A1 discloses a headlamp with two light point sources. The headlamp switches off those light points of the respective light point source that would not overlap with a light point of the other light point source on a projection surface. Thus, the headlamp can project a sharp and high-contrast symbol.

There is a constant need to provide a well-lit illumination region in front of the motor vehicle well. Accordingly, it is an object of the invention to provide a well-lit illumination region in front of a motor vehicle.

SUMMARY OF THE INVENTION

One aspect of the invention relates to a headlamp for a motor vehicle. The headlamp has first and second projection devices that are laterally offset with respect to one another. The first projection device illuminates a large or wide surface and the second projection device illuminates a small or narrow surface located within the large or wide surface. An intensity profile of the light emitted by the first projection device and an intensity profile of the light emitted by the second projection device are matched to one another in the lateral direction so that at least one lateral peripheral region of the narrow surface has a gradual transition to the intensity in the wide surface outside the narrow surface and a substantially constant intensity between the lateral peripheral regions of the narrow surface within the narrow surface. The intensity profiles of the first and second projection devices are designed for a shorter distance than a projection distance that is designated for the wide or large surface and the narrow or small surface.

The projection devices may be provided within a common headlamp housing and can be provided for generating illumination for at least a portion of an illumination region that is intended for a low beam and/or a high beam. The shape and the intensity, in particular the illuminance in lux, of the illumination in the illumination region of a low beam and/or a high beam generally is regulated by statutory provisions. To be able to image with the aid of the headlamp, the illumination region intended for the low beam and/or high beam, projection devices of the respective headlamp can emit visible light of a specific luminous intensity (e. g. in candela) and can emit the emitted light with a designated shape of the illumination region by using suitable measures, for example bezels. The projection device of some embodiments has a multiplicity of light-emitting elements configured as LEDs. The LEDs are arranged in rows and columns in the form of a matrix. Thus, it is possible to achieve a desired shape and/or a desired intensity for the illumination region by suitably controlling the respective light-emitting elements.

Most parts of the illumination region in areas of a lane in front of the motor vehicle should be lit as brightly as possible without exceeding brightness permitted by local statutes and regulations. However, a lower intensity of the brightness may be desired in regions that are adjacent to the brightly lit areas, for example in the region of the oncoming lane or at the roadside, so as not to dazzle other people. For this purpose, the first projection device can be used to illuminate a wide surface that can extend in the lateral direction and/or in the height direction or in the driving direction so far that even the regions that are illuminated for less brightness can be covered. The second projection device can illuminate a comparatively narrow or smaller surface where the intensities of the visible light emitted by the first projection device and by the second projection device can be superposed. A control device can control the luminous intensities of the respective projection devices to ensure that the region that is illuminated twice in the narrow or small surface does not reach an excessive illuminance. The control device also can avoid a hard light/dark cut-off and an abrupt intensity jump between the narrow or small surface and the part of the wide or large surface located outside the narrow or small surface, thereby improving the visual perception for the driver of the motor vehicle in the darker areas of the illumination region.

It has been found that adverse optical effects can occur in a close range just in front of the motor vehicle due to the lateral offset of the first projection device relative to the second projection device and the projection distance of the illumination region that is designated for a specific projection device. If, during cornering and/or when driving up a hill, the illumination region generated by the headlamps of the motor vehicle does not strike the ground at the designated projection distance designed for a horizontal surface but rather strikes the ground at a significantly shorter distance. Thus, bright and dark stripes can occur in the illumination region because the intensity profiles of the projection devices that are designed for the designated projection distance no longer would be superposed as intended.

To avoid these adverse optical effects, the intensity profiles of the projection devices of some embodiments are designed not for an illumination region occurring in the case of a horizontal surface at the designated projection distance, but for an illumination region occurring at a shorter distance compared to the designated projection distance. Adverse optical effects are avoided by projecting the illumination region at a shorter distance than the designated projection distance so that the visual perception of the driver remains good even in such a situation and is not impaired by any visual effects that occur. This improves driving safety in the dark.

Here, a non-optimum intensity distribution at the designated projection distance is deliberately accepted. This is based on the finding that any impairment of the desired intensity distribution has less and less weight over an increasing distance, and the lateral offset of the projection devices increasingly levels off and becomes less relevant as the distance increases. In addition, the driver of the motor vehicle can detect increasingly fewer details over an increasing distance so that an impaired intensity distribution in regions of the illumination region that are farther away is less relevant for the driver. By contrast, enhanced safety can be achieved by giving a driver particularly good visibility in regions closer to front of the motor vehicle. Thus, these regions closer to the front of the vehicle are illuminated by the headlamp with greater illumination so that the driver quickly and correctly can assess the situation and react appropriately. By designing the intensity profiles for a distance that is actually too short, it is possible with a substantially negligible impairment of the intensity profile at the designated projection distance to achieve significantly improved visual perception in a particularly safety-critical close range. Accordingly, a well-lit illumination region in front of a motor vehicle over a particularly large distance region is made possible.

For low beam, the range of the illumination region in a passenger motor vehicle is generally a hundred times that of the installation height of the headlamp. The designated projection distance therefore corresponds to substantially 100 times the installation height of the headlamp in the motor vehicle. At an installation height of 65 cm, the illumination range thus spans 65 m and the designated projection distance is 65 m.

In particular, for the distance d for which the intensity profiles of the first projection device and of the second projection device are designed, relative to a projection distance SA for a low beam, $0.40 \leq d/SA \leq 0.95$, in particular $0.50 \leq d/SA \leq 0.90$, preferably $0.60 \leq d/SA \leq 0.85$, and with particular preference $0.70 \leq d/SA \leq 0.80$. With such a shift in the driving direction of the distance d for the optimum intensity profile of the illumination region to the nominal designated projection distance SA for the low beam, no significant adverse optical effects that would impair the optical perception of the driver should be expected at the designated projection distance. At the same time, the safety-critical close range in front of the motor vehicle can be lit sufficiently well without significant adverse optical effects.

In some embodiments, the intensity profiles of the first and second projection devices are configured to be able to be shifted and/or extended in at least one linear direction (e.g. the lateral direction) in dependence on a measurement variable. This makes it possible to identify, with the aid of the measurement variable, specific situations in which good lighting of the illumination region is advantageous at a specific distance in deviation from the designated projection distance with as few adverse optical effects as possible. It may be sufficient that, with the aid of a light-emission device that controls the light-emitting elements of the first projection device and/or the second projection device, the profile of the intensity profile is shifted linearly or laterally and/or extended proportionally. The intensity profile and the lighting of the illumination region can thereby be adapted dynamically to variable circumstances, and good lighting without adverse optical effects can be achieved.

The measurement variable of some embodiments may be a driving speed of a motor vehicle having the headlamp and/or a measured actual projection distance. At a high driving speed, for example when driving on a motorway, suddenly appearing objects are not expected in a close range in front of the motor vehicle because these objects are already discernible at a far distance from the motor vehicle. As a result, a good intensity profile at a far distance, such as the designated projection distance or possibly even farther away, is advantageous. At a low driving speed, the driver, for safety reasons, will wish to make possible a particularly short braking distance. Therefore, a good intensity profile of the illumination region at a significantly shorter distance, corresponding to the driving speed, than the designated projection distance is advantageous. The three-dimensional region in front of the motor vehicle can be sampled, for example with the aid of a distance sensor, and consequently the actual projection distance, which possibly deviates from the designated projection distance, can be measured and the intensity profile can be adapted dynamically to the actual projection distance. Thus, adverse optical effects in the illumination region can be minimized.

The first projection device and the second projection device each can have a multiplicity of separately controllable light-emitting elements. Thus, a light-emission period of the respective light-emitting element and/or a light-emission start of various light-emitting elements are settable relative to one another for setting the intensity profile. The individual control of each individual light-emitting element enables the shape and the intensity of the illumination region to adapted widely to variable situations.

The first and second projection devices of some embodiments are of substantially the same type and may be identical parts. In these embodiments, different focusing optical units may be provided for the first projection device and the second projection device. Thus, production costs can be kept low. The different focusing optical units may have lenses of different focal lengths arranged in the beam path of the respective projection device.

A ratio of the wide surface Aw to the narrow surface An may be $1.5 \leq Aw/An \leq 8.0$, in particular $2.0 \leq Aw/An \leq 6.0$ and preferably $Aw/An=4.0 \pm 0.5$. With such a ratio, the illuminances stipulated in a set of regulations for the illumination region can be kept easily and a sufficient brightness both in the narrow surface and in the part of the wide surface provided outside the narrow surface can be achieved.

In particular, a lateral offset v of a periphery of the first projection device facing the second projection device with respect to a periphery of the second projection device facing the first projection device may be in a range $2.0 \text{ cm} \leq v \leq 20.0 \text{ cm}$, in particular $5.0 \text{ cm} \leq v \leq 15.0 \text{ cm}$, preferably $v=10.0 \text{ cm} \pm 1.0 \text{ cm}$. For such an offset, sufficient cooling of the light-emitting elements of the projection devices can be achieved while keeping the installation space small. In particular, it is possible to select the lateral offset to be of an amount such that cooling of the light-emitting elements by natural convection suffices. Significant adverse optical effects caused by a correspondingly large offset need not be feared due to the design of the intensity profiles for a shorter distance.

A further aspect of the invention relates to a headlamp system for a motor vehicle. The headlamp system has a left headlamp that can be configured and developed as described above, and a right headlamp that can be configured and developed as described above. Thus, the wide surface, or the wide surface and the narrow surface, of the left headlamp and the right headlamp overlap at a designated projection distance. Accordingly, an intensity profile of the light emitted by the left headlamp and an intensity profile of the light emitted by the right headlamp are matched to one another in the lateral direction in a manner such that, in at least one lateral peripheral region of the respective narrow surface, a gradual transition to the intensity in the wide surface outside the narrow surface and a substantially constant intensity between the mutually outer lateral peripheral regions of the respective narrow surface within the narrow surface is obtained. The intensity profiles of the left headlamp and of the right headlamp are designed for a shorter distance than a projection distance that is designated for the wide surface and the narrow surface. Even when the illumination regions of the left headlamp and of the right headlamp overlap, it is possible with a substantially negligible impairment of the intensity profile at the designated projection distance by designing the intensity profiles for a distance that is actually too short to significantly improve the visual perception in a particularly safety-critical close range. As a result, a well-lit illumination region in front of a motor vehicle over a particularly large distance region is made possible.

An independent aspect of the invention relates to a headlamp system for a motor vehicle, having a left headlamp and a right headlamp, wherein the left headlamp and the right headlamp each have a first projection device for illuminating a wide surface and a second projection device, laterally offset with respect to the first projection device, for illuminating a narrow surface located within the wide surface. The wide surface, or the wide surface and the narrow surface, of the left headlamp and of the right headlamp overlap at a designated projection distance. An intensity profile of the light emitted by the left headlamp and an intensity profile of the light emitted by the right headlamp are matched to one another in the lateral direction in a manner such that, in at least one lateral peripheral region of the respective narrow surface, a gradual transition to the intensity in the wide surface outside the narrow surface and a substantially constant intensity between the mutually outer lateral peripheral regions of the respective narrow surface within the narrow surface occur. The intensity profiles of the left headlamp and the right headlamp are designed for a shorter distance than a projection distance that is designated for the wide surface and the narrow surface.

Even if the intensity profiles of the projection devices within the respective headlamp are designed for the designated projection device, it is possible by adapting the intensity profiles of the illumination region of the respective headlamp as a whole to achieve, analogously to the adaptation of the intensity profiles of the respective projection devices described above within the individual headlamp, a comparable effect. The explanations described above with respect to the respective projection device in this regard apply analogously to the left and right headlamps. Even when the illumination regions of the left headlamp and of the right headlamp overlap, it is possible with a substantially negligible impairment of the intensity profile at the designated projection distance by designing the intensity profiles for a distance that is actually too short to significantly improve the visual perception in a particularly safety-critical close range. Thus, a well-lit illumination region in front of a motor vehicle over a particularly large distance region is made possible.

The invention is explained below by way of example with reference to the appended drawings on the basis of preferred embodiments. The features presented below may in each case individually or in combination represent an aspect of the invention.

DETAILED DESCRIPTION

Figure 1:
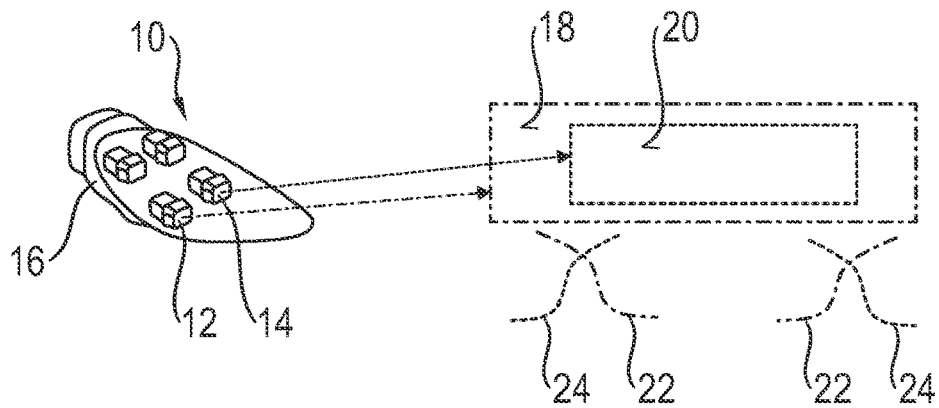
FIG. 1 is a schematic illustration of intensity profiles of projection devices of a headlamp designed for a designated projection distance and with the intensity profiles being at the designated projection distance.

The headlamp 10 illustrated only partially in FIG. 1 can be used as a left or right headlamp of a motor vehicle to illuminate an illumination region in front of the motor vehicle, in particular in the form of a low beam or a high beam. The headlamp 10 has a first projection device 12, having plural light-emitting elements that are configured as LEDs and are arranged in the form of a matrix, and a second projection device 14, having plural light-emitting elements that are configured as LEDs and are arranged in the form of a matrix. The projection devices 12 and 14 are spaced laterally from one another in a common headlamp housing 16 of the headlamp 10. The first projection device 12 illuminates a wide surface 18, while the second projection device 14 illuminates a narrow surface 20 located completely within the wide surface 18. As a result, the narrow surface 20 is illuminated more brightly than a part of the wide surface 18 that is located outside the narrow surface 20. By suitably controlling the light-emitting elements of the respective projection device 12, 14, the intensity, in particular the illuminance and/or luminous intensity, of the projection devices 12, 14 transverse to the driving direction can have a profile such that a hard brightness jump at the lateral periphery of the narrow surface 20 is avoided. For this purpose, the intensity of the first projection device 12 can decrease inwardly from the outside, while the intensity of the second projection device 14 increases, as a result of which a gradual intensity transition that does not so strongly affect the visual perception of the driver of the motor vehicle occurs when the intensities correspondingly overlap in a lateral peripheral region of the narrow surface 20.

However, if a first intensity profile 22 of the first projection device 12 and a second intensity profile 24 of the second projection device 14 are designed for the designated projection distance that is provided, for example, for low beam, as is illustrated in FIG. 1, adverse optical effects, in particular dark and bright perpendicular stripes, occur due to the lateral offset of the projection devices 12, 14 if the illumination region illuminated by the projection devices 12, 14 spans only a shorter distance than the designated projection distance due to obstacles, driving uphill or other situations.

Figure 2:
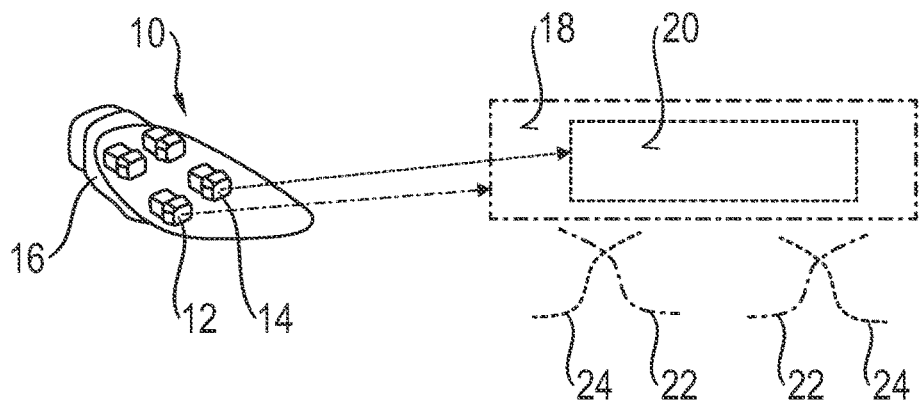
FIG. 2 is a schematic illustration of intensity profiles of projection devices designed for a shorter distance than the designated projection distance but with the projection devices being at the designated projection distance.

To avoid such adverse optical effects, the intensity profiles 22, 24 of the projection devices 12, 14 deliberately are designed for a shorter distance, for example by the intensity profiles 22, 24 being slightly shifted toward the center of the surfaces 18, 20, as is illustrated in FIG. 2. The respective intensity profiles 22, 24 are illustrated graphically below the representations of the wide (large) illuminated surface 18 and the narrow (small) illuminated surface 20. If the projection devices 12, 14 generate an illumination region only over a shorter distance than the designated projection distance and, as a result, the wide surface 18 and the narrow surface 20 are projected over a shorter distance, smaller surfaces result for the wide surface 18 and the narrow surface 20, for which, however, the intensity profiles 22, 24 that deliberately are designed for a shorter distance provide optimum illumination with the non-changing lateral offset of the projection devices 12, 14 with respect to one another.

With the designated projection distance illustrated in FIG. 2, substantially no adverse optical effects are perceivable by the driver with this design of the intensity profiles 22, 24. In addition, any difference between a possibly not optimum illumination and an optimum illumination for the designated projection distance is hardly noticeable for the driver because the driver can hardly perceive such differences for the comparatively wide designated projection distance. By designing the intensity profiles 22, 24 for a distance that is actually too short, it is possible with a substantially negligible impairment of the intensity profile at the designated projection distance to significantly improve the visual perception in a particularly safety-critical close range, as a result of which a well-lit illumination region in front of a motor vehicle over a particularly large distance region is made possible.

Figure 3:
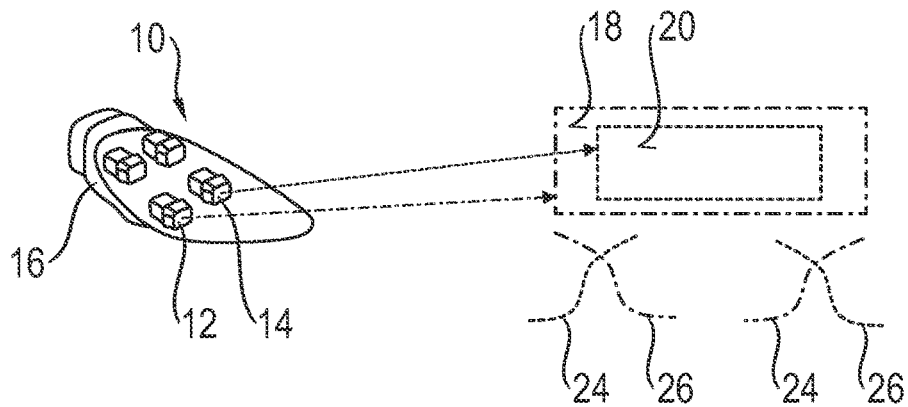
FIG. 3 is a schematic illustration of intensity profiles designed for a shorter distance than the designated projection distance, but with the projection devices of the headlamp being at the shorter distance.

Adverse optical effects have been observed to occur in illuminated areas close to the vehicle when the vehicle is traveling up a hill. These adverse optical effects can be avoided by illuminating smaller surfaces 18 and 20, as shown in FIG. 3. Thus, the intensity profiles 22 and 24 of the respective projection devices 12 and 14 shown in FIG. 3 are both shorter. Adverse optical effects are avoided by projecting the illumination region at a shorter distance than the designated projection distance so that the visual perception of the driver remains good even in such a situation and is not impaired by any visual effects that occur.

What is claims is:

1. A headlamp for a motor vehicle, having
a first projection device (12) configured for illuminating a wide surface (18) and
a second projection device (14) laterally offset with respect to the first projection device (12) and configured for illuminating a narrow surface (20) located within the wide surface (18), wherein:
light emitted by the first projection device (12) has a first intensity profile (22) in a lateral direction and light emitted by the second projection device (14) has a second intensity profile (24) in a lateral direction, the second projection device (12) being configured and operated to define at least one lateral peripheral region of the second intensity profile (24) that gradually transitions to an intensity of the first intensity profile existing in the wide surface (18) outside the narrow surface (20), and a substantially constant intensity occurs within the narrow surface (20) at positions inward of the lateral peripheral regions of the narrow surface (20), and
the intensity profiles (22, 24) of the first projection device (12) and of the second projection device (14) are designed for shorter distances than projection distances designated for the wide surface (18) and the narrow surface (20).

2. The headlamp of claim 1, wherein, for a ratio of distance d for which the intensity profiles (22, 24) of the first projection device (12) and the second projection device (14) are designed, relative to a projection distance $S_A$ for a low beam is in a range $0.40 \leq d/S_A \leq 0.95$.

3. The headlamp of claim 1, wherein the intensity profiles (22, 24) of the first projection device (12) and of the second projection device (14) are configured to be able to be shifted in the lateral direction and/or to be extendable in the lateral direction in dependence on a measurement variable.

4. The headlamp of claim 3, wherein the measurement value is at least one of a driving speed of a motor vehicle having the headlamp (10) and a measured actual projection distance.

5. The headlamp of claim 1, wherein each of the first projection device (12) and the second projection device (14) have a multiplicity of separately controllable light-emitting elements, and wherein a light-emission period of the respective light-emitting element and a light-emission start of various light-emitting elements are settable relative to one another for setting the intensity profile (22, 24).

6. The headlamp of claim 1, wherein the first projection device (12) and the second projection device (14) are substantially identical parts provided with different focusing optical units.

7. The headlamp of claims 1, wherein a ratio of the wide surface area $A_W$ to the narrow surface area $A_N$ is in a range of $1.5 \leq A_W/A_N \leq 8.0$.

8. The headlamp of claim 1, wherein a lateral offset v of a periphery of the first projection device (12) facing the second projection device (14) with respect to a periphery of the second projection device (14) facing the first projection device (12) is in a range of $2.0 \text{ cm} \leq v \leq 20.0 \text{ cm}$.

9. A headlamp system for a motor vehicle having a left headlamp and a right headlamp in accordance with the headlamp of claim 1, wherein the wide surface (18), or the wide surface (18) and the narrow surface (20), of the left headlamp and of the right headlamp overlap at a designated projection distance, wherein
an intensity profile (22, 24) of the light emitted by the left headlamp and an intensity profile (22, 24) of the light emitted by the right headlamp are matched to one another in the lateral direction in a manner such that, in at least one lateral peripheral region of the respective narrow surface (20), a gradual transition to the intensity in the wide surface (18) outside the narrow surface (20) and a substantially constant intensity between mutually outer, lateral peripheral regions of the respective narrow surface (20) within the narrow surface (20) occur, and
the intensity profiles (22, 24) of the left headlamp and the right headlamp are designed for a shorter distance than a projection distance designated for the wide surface (18) and the narrow surface (20).

10. A headlamp system for a motor vehicle, comprising:
a left headlamp; and
a right headlamp, wherein
the left headlamp and the right headlamp each have a first projection device (12) for illuminating a wide surface (18) and a second projection device (14) laterally offset with respect to the first projection device (12) for illuminating a narrow surface (20) located within the wide surface,
the wide surface (18), or the wide surface (18) and the narrow surface (20), of the left headlamp and of the right headlamp overlap at a designated projection distance,
an intensity profile of the light emitted by the left headlamp and an intensity profile of the light emitted by the right headlamp are matched to one another in the lateral direction in a manner such that, in at least one lateral peripheral region of the respective narrow surface (20), a gradual transition to the intensity in the wide surface (18) outside the narrow surface (20) and a substantially constant intensity between the mutually outer, lateral peripheral regions of the respective narrow surface (20) within the narrow surface (20) occur, and
the intensity profiles of the left headlamp and of the right headlamp are designed for a shorter distance than a projection distance designated for the wide surface (18) and the narrow surface (20).

* * * * *